(12) United States Patent
Shiba

(10) Patent No.: US 7,372,784 B2
(45) Date of Patent: May 13, 2008

(54) OPTICAL HEAD APPARATUS

(75) Inventor: Kazuo Shiba, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 595 days.

(21) Appl. No.: 10/849,649

(22) Filed: May 20, 2004

(65) Prior Publication Data

US 2005/0018554 A1 Jan. 27, 2005

(30) Foreign Application Priority Data

May 19, 2003 (JP) .............................. 2003-144352

(51) Int. Cl.
*G11B 7/00* (2006.01)
(52) U.S. Cl. ............................. 369/44.14; 369/44.24; 369/118
(58) Field of Classification Search .............. 369/118, 369/44.24
See application file for complete search history.

(56) References Cited

U.S. PATENT DOCUMENTS 4,517,666 A * 5/1985 Ando ....................... 369/44.24
5,664,957 A * 9/1997 Starr .......................... 439/207
5,844,879 A * 12/1998 Morita et al. ............... 369/118
6,660,986 B2 * 12/2003 Matsumoto et al. ....... 250/201.5
7,099,245 B2 * 8/2006 Yumiba et al. ........... 369/47.21

FOREIGN PATENT DOCUMENTS

JP 02-157810 * 6/1990

OTHER PUBLICATIONS

JP 2000-306260 Translation Feb. 11, 2000 NakaJima Junsaku.*
Patent Abstracts of Japan, Publication No. 2002-306260 published Nov. 2, 2000 (Optocal Pickup—Sharp Corp.).

* cited by examiner

*Primary Examiner*—Thang V. Tran
*Assistant Examiner*—Van T. Pham
(74) *Attorney, Agent, or Firm*—Reed Smith LLP

(57) ABSTRACT

The present invention proposes an optical head apparatus provided with light-blocking structure that can reliably prevent nonessential light from reaching the photo detector, without being an impediment to miniaturization and flattening, moreover, without increasing manufacturing cost. In an optical head apparatus, and in a lens holder, light-blocking section is provided that blocks nonessential light from passing outside the effective diameter of objective lens. This light-blocking section is constructed so that it extends only in tracking direction T of objective lens 5. Further, light-blocking face of light-blocking section slants at an angle of 1° or more toward the face orthogonal to the optical axis, consequently, nonessential light is reflected in a direction other than the direction of photo detector.

8 Claims, 4 Drawing Sheets

PRIOR ART

OPTICAL HEAD APPARATUS

CROSS-REFERENCE TO RELATED APPLICATION

This application claims priority of Japanese Application No. 2003-144352, filed May 22, 2003, the complete disclosure of which is hereby incorporated by reference

BACKGROUND OF THE INVENTION a) Field of the Invention

This invention relates to optical head apparatus used in regeneration, etc. of optical recording disks such as CD and DVD types. In more detail, in optical head apparatus, the inventions relates to light-blocking structure toward nonessential light in light emitted from the light source that passes outside the effective diameter of the objective lens and proceeds toward the optical recording disk.

b) Description of the Related Art

In optical head apparatus used in regeneration, etc. of optical recording disks such as CD and DVD types, objective lens having relatively large aperture was used heretofore; however, in recent years, in order to respond to demand for miniaturization and high-speed access, the trend has been to miniaturize and flatten the objective lens and lens holder, while leaving the movable range of the lens holder (movable range of objective lens) unchanged.

Nonetheless, when objective lens and lens holder are miniaturized and flattened to achieve weight reduction, it is possible to increase servo performance, but when the objective lens is moved in the tracking direction, laser light passes outside the effective diameter of the objective lens to reach the optical recording medium, is reflected by the optical recording medium and enters the photo detector. Such nonessential light, even when received by the photo detector, does not contain regeneration information because it has not received modulation from the recording pit; it is not usable in information regeneration, and moreover, gives rise to large offset in the regenerated signal, and becomes the cause of errors such as level changes at the time of information regeneration. Further, nonessential light also causes offset to occur in tracking error signals and focusing error signals.

As a measure to resolve such problems, as shown in FIG. 4, structure has been proposed wherein, by means of attaching ring-shaped light-blocking plate 103 to lens holder 102 retaining objective lens 101, even when objective lens 101 undergoes maximum movement in tracking direction T, unnecessary light does not reach the optical recording medium by passing outside the effective diameter of objective lens 101.

Moreover, in the optical head apparatus disclosed here, light-blocking plate 103 is located orthogonally to optical axis of objective lens 101; light-blocking face 105 of light-blocking plate 103 is coated wih light-blocking paint, or surface-roughening treatment is implemented to scatter light from the roughened surface. Consequently, nonessential light does not proceed toward photo detector by reflection at light-blocking face 105; therefore, error, etc. caused by nonessential light at the time of information regeneration can be prevented.

Problems To Be Solved By The Invention

Nonetheless, light-blocking plate 103 used in conventional optical head apparatus is a large part that surrounds objective lens 101 at the same width all around, thus there is the problem of having an impediment to miniaturization and weight reduction of the optical head apparatus. Further, in light-blocking plate 103 used in conventional optical head apparatus, there is need to coat light-blocking face 105 with light-blocking paint, or implement roughening treatment of the face, consequently, the problem of high manufacturing cost results.

OBJECT AND SUMMARY OF THE INVENTION

In view of the above problems, the primary object of this invention is to provide optical head apparatus with light-blocking structure that can reliably prevent nonessential light from reaching the photo detector, without being an impediment to miniaturization and weight reduction.

Further, an object of this invention is to provide optical head apparatus wherein it is possible to implement measures toward nonessential light without increasing manufacturing cost.

In order to solve the aforementioned problems, in accordance with the invention, in optical head apparatus having a light source, and a lens holder retaining objective lens that converges emitted light emitted from said light source on an optical recording medium, and lens drive apparatus for driving this lens holder in the tracking direction at the least, and a photo detector for receiving reflected light from aforementioned optical recording medium, the aforementioned objective lens or aforementioned lens holder is provided with a light-blocking section that has spread out on both sides of the tracking direction and that is capable of blocking nonessential light from the aforementioned light source passes outside the effective diameter of the aforementioned objective lens and proceeds toward aforementioned optical recording medium.

According to the invention, in view of the fact that the occurrence of nonessential light that reaches optical recording medium by passing outside the effective diameter of the objective lens happens when objective lens and lens holder move in the tracking direction, whether light-blocking section is provided only in the tracking direction, or provided as a ring around the entire perimeter of the objective lens, width is narrow in the direction orthogonal to the tracking direction, width is wide in the tracking direction. For this reason, the occurrence of nonessential light is prevented reliably by the light-blocking section having minimum necessary size. Thus there is no impediment to miniaturization and weight reduction of the optical head apparatus.

According to the invention, structure is such that light flux made parallel by collimating lens enters the aforementioned objective lens; in the aforementioned light-blocking section, light-blocking face positioned on the side of aforementioned light source is preferably slanted at an angle of 1° or more toward the face orthogonal to the optical axis of aforementioned objective lens. Here, the light-blocking face may have structure constituting one face, or structure constituting multiplicity of faces; parts comprising any of the light-blocking faces should be preferably slanted at an angle of 1° or more toward the face orthogonal to the optical axis of aforementioned objective lens. When construction is implemented in this fashion, even when the light entering the objective lens is in the form of parallel rays, nonessential light does not proceed toward photo detector by reflection from the light-blocking face. Therefore, there is no need to coat light-blocking paint on the light-blocking face or implement treatment to roughen the face for the purpose of preventing nonessential light from reflecting from the light-blocking face and proceeding to photo detector; measures can be implemented toward nonessential light without increase in manufacturing cost.

Further according to the invention, dimensions at both ends of the aforementioned light-blocking section in the tracking direction are preferably dimensions that can block light from the aforementioned nonessential light in the entire range of movement of aforementioned lens holder in the tracking direction. In other words, dimensions at both ends of the light-blocking section in the tracking direction are preferably dimensions that take into account the movement of the objective lens and the lens holder in the tracking direction.

For example, in the aforementioned objective lens, when construction is such that light flux converted to parallel rays by collimating lens enters therein, if the dimensions of the aforementioned light-blocking section in the tracking direction, effective diameter of aforementioned collimating lens, and maximum amount of movement of the aforementioned objective lens in the tracking direction are respectively designated W, C, K, then W, C, K preferably are selected to satisfy the following formula $W>C+2K$.

Still further according to the invention, the aforementioned light-blocking section can be utilized as either a part that is constructed as one with aforementioned lens holder, or as a part that is attached afterwards to the aforementioned lens holder; however, when the light-blocking part constructed as one with aforementioned lens holder is utilized, it is possible to implement measures toward nonessential light without increasing manufacturing cost. On the other hand, when the light-blocking part is utilized that is attached afterwards to the lens holder, measures toward nonessential light can be implemented without any modifications to the conventional lens holder structure.

DESCRIPTION OF THE PREFERRED EMBODIMENTS

Below, one example of the optical apparatus utilizing this invention is explained by using the figures as reference.

Overall Construction

Figure 1:
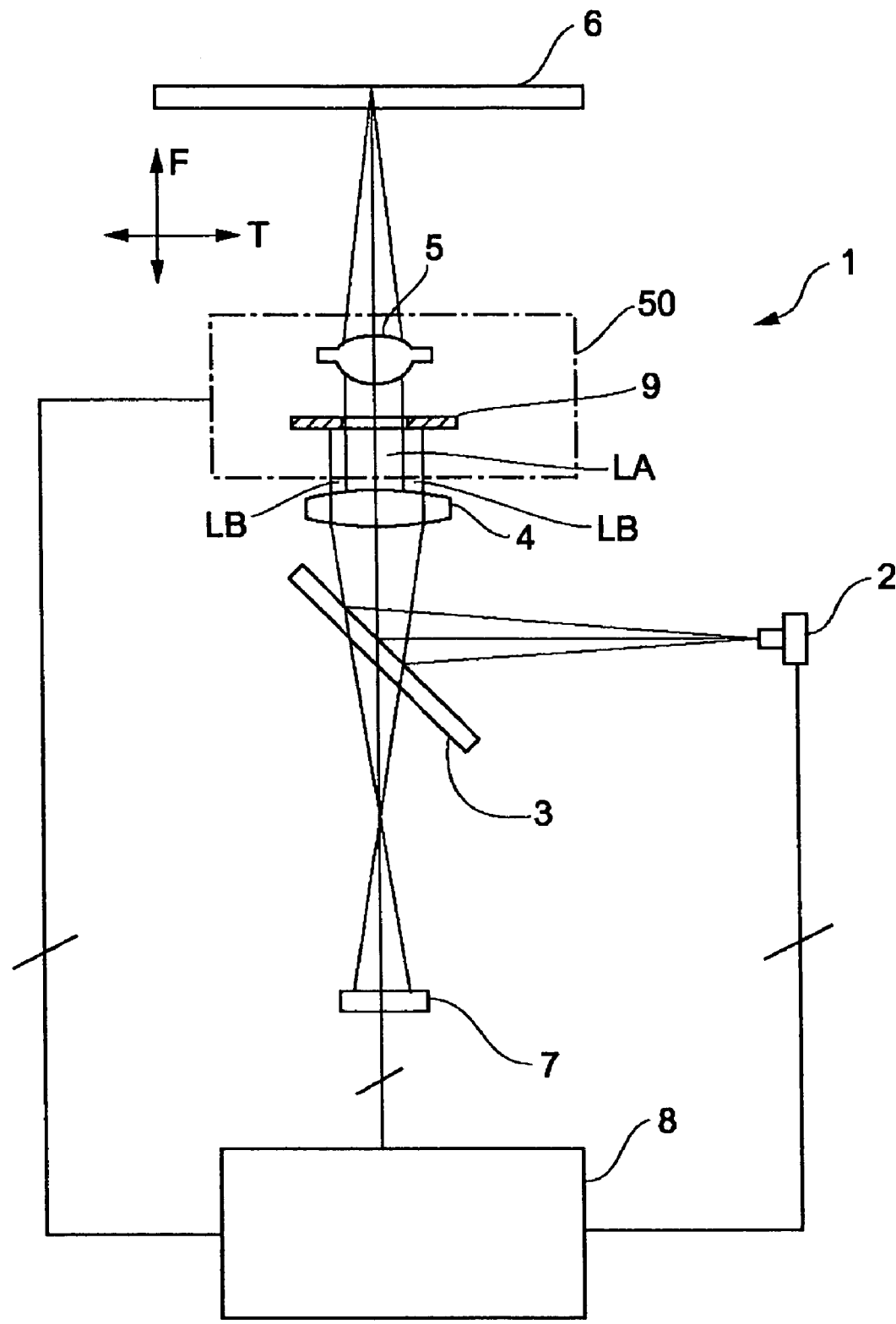
FIG. 1 is a simplified structural diagram showing the optical head apparatus utilized in this invention.

FIG. 1 is a simplified structural diagram showing the optical head apparatus of this example. Optical head apparatus 1 shown in this figure implements information recording and information regeneration for optical recording disk 6 (optical recording medium) such as CD or DVD; laser light emitted from laser light source 2 is reflected by half-mirror 3, and thereafter converted to parallel rays by collimating lens 4. Then, parallel rays emitted from collimating lens 4 converge on objective lens 5 to focus on the information recording face of optical recording disk 6. The positions of tracking direction and focusing direction for objective lens 5 are under servo control of objective lens drive mechanism 50. Further, light returning by reflection from optical recording disk 6 enters photo detector 7 by bypassing objective lens 5, collimating lens 4, and half mirror 3. Drive control apparatus 8, based on amount of light received by photo detector 7, implements information regeneration processing, and at the same time, implements servo control of the positions in tracking direction and focusing direction for objective lens 5 by drive control of objective lens drive mechanism 50. Further, drive control of laser light source 2 is also implemented.

In optical head apparatus constructed in this fashion, when objective lens 5 is moved in the tracking direction, parallel light flux LA from collimating lens 4 spreads outside the effective diameter of objective lens 5. In such a situation, laser light passes outside the effective diameter of objective lens 5 and reaches optical recording disk 6, is reflected by optical recording disk 6 and enters photo detector 7. Thus, in optical head apparatus 1 in this embodiment, light-blocking section 9 is positioned to block light passing outside the effective diameter of objective lens 5 as nonessential light LB; this light-blocking section 9, as explained in the concrete example below, is constructed for objective lens 5 or lens holder retaining it.

Objective Lens Drive Mechanism

Figure 2:
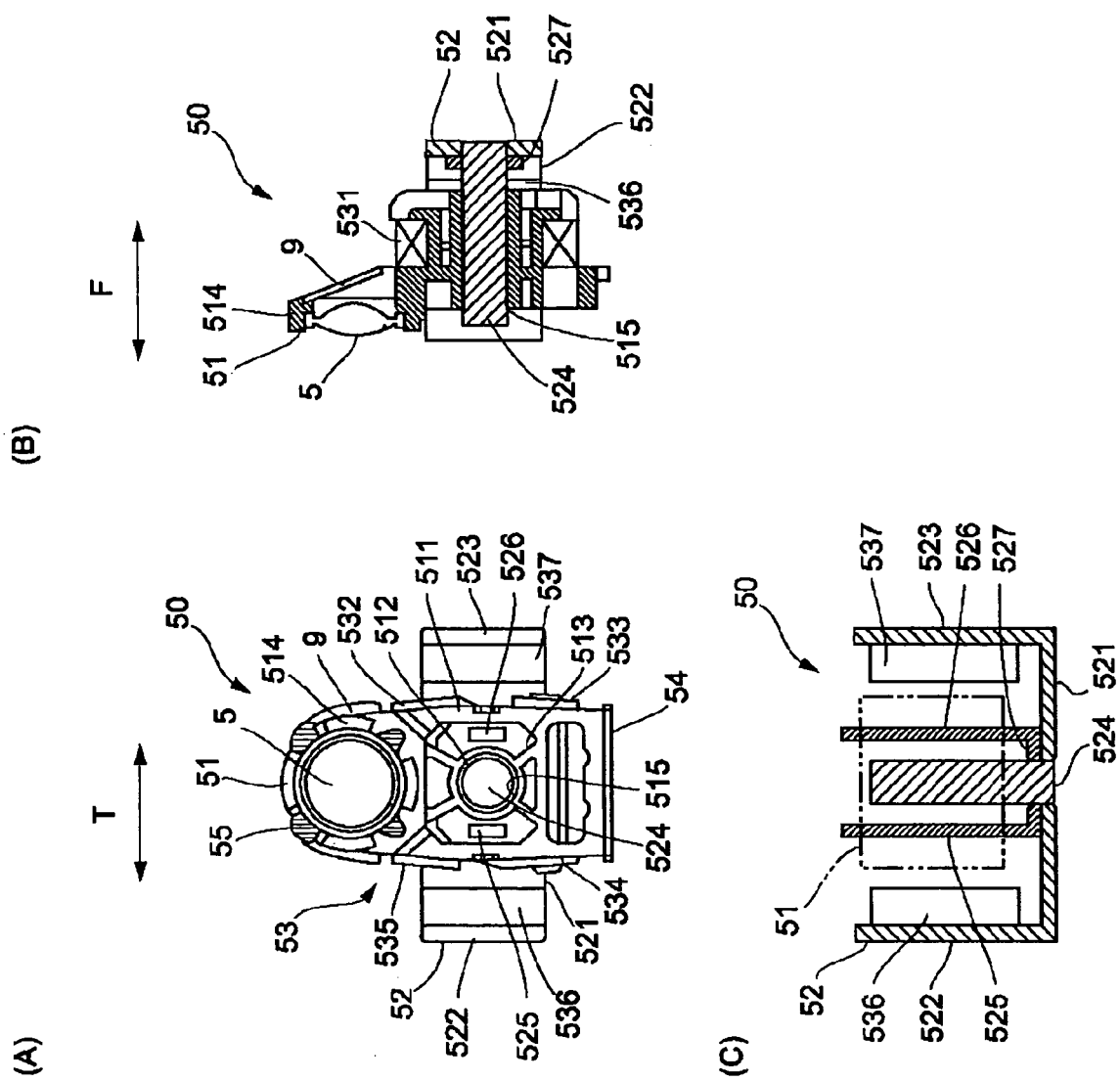
FIG. 2A, FIG. 2B and FIG. 2C show plane view, vertical cross-sectional view, and horizontal cross-section view, of the objective lens drive mechanism in the optical head apparatus shown in FIG. 1.

FIGS. 2(A), (B), (C) show plane view, vertical cross-section view, and horizontal cross-section view, of objective lens drive mechanism 50 in the optical head apparatus of this embodiment. FIGS. 3(A), (B), (C), (D) show plane view, view of left-side face, view of bottom face, and front view, of the lens holder used in objective lens drive mechanism 50 shown in FIG. 2.

Figure 3:
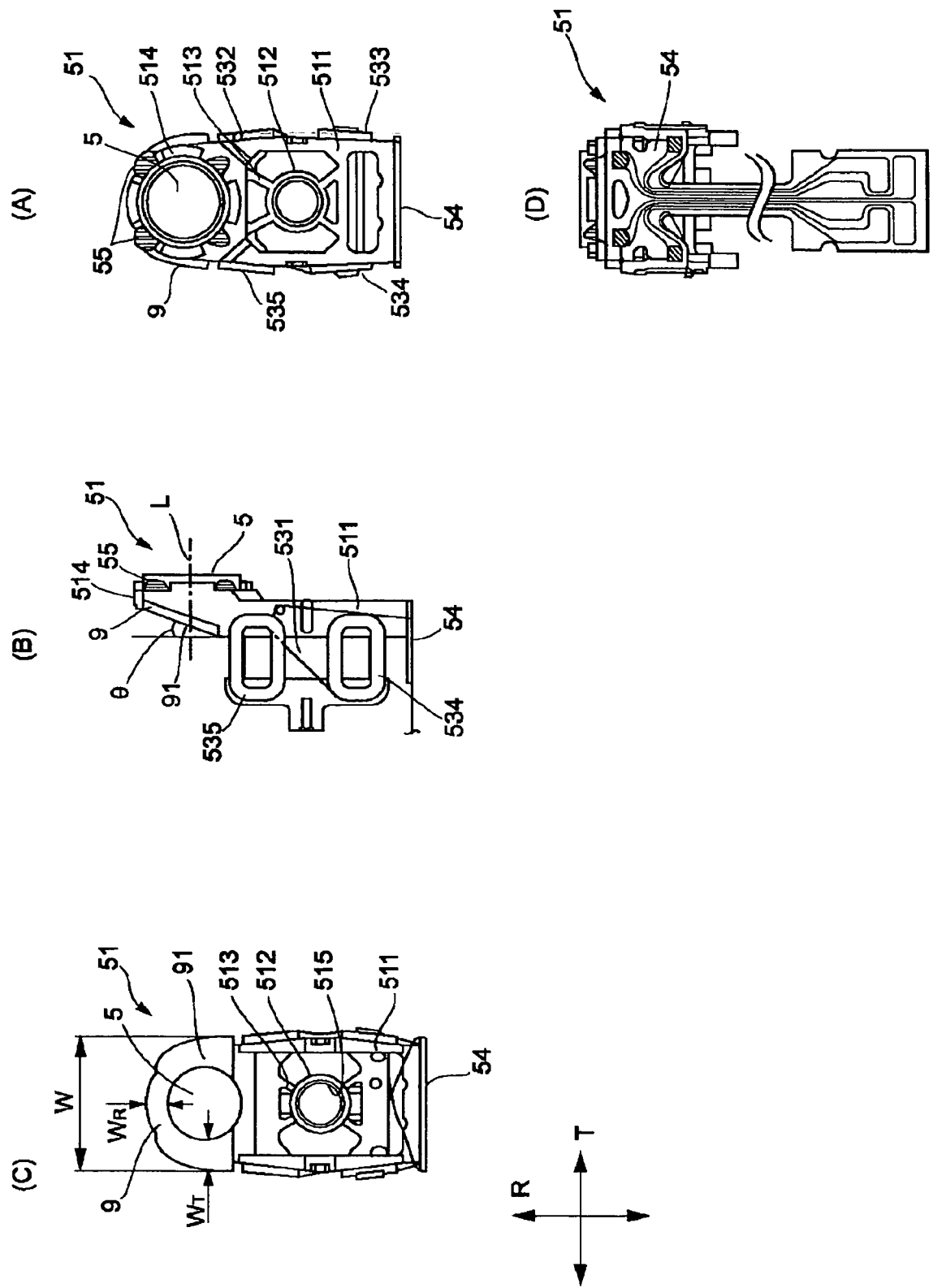
FIG. 3A, FIG. 3B, FIG. 3C and FIG. 3D show plane view, view of left-side face, view of bottom face, and front view, of the lens holder used in objective lens drive mechanism shown in FIG. 2.
Figure 4:
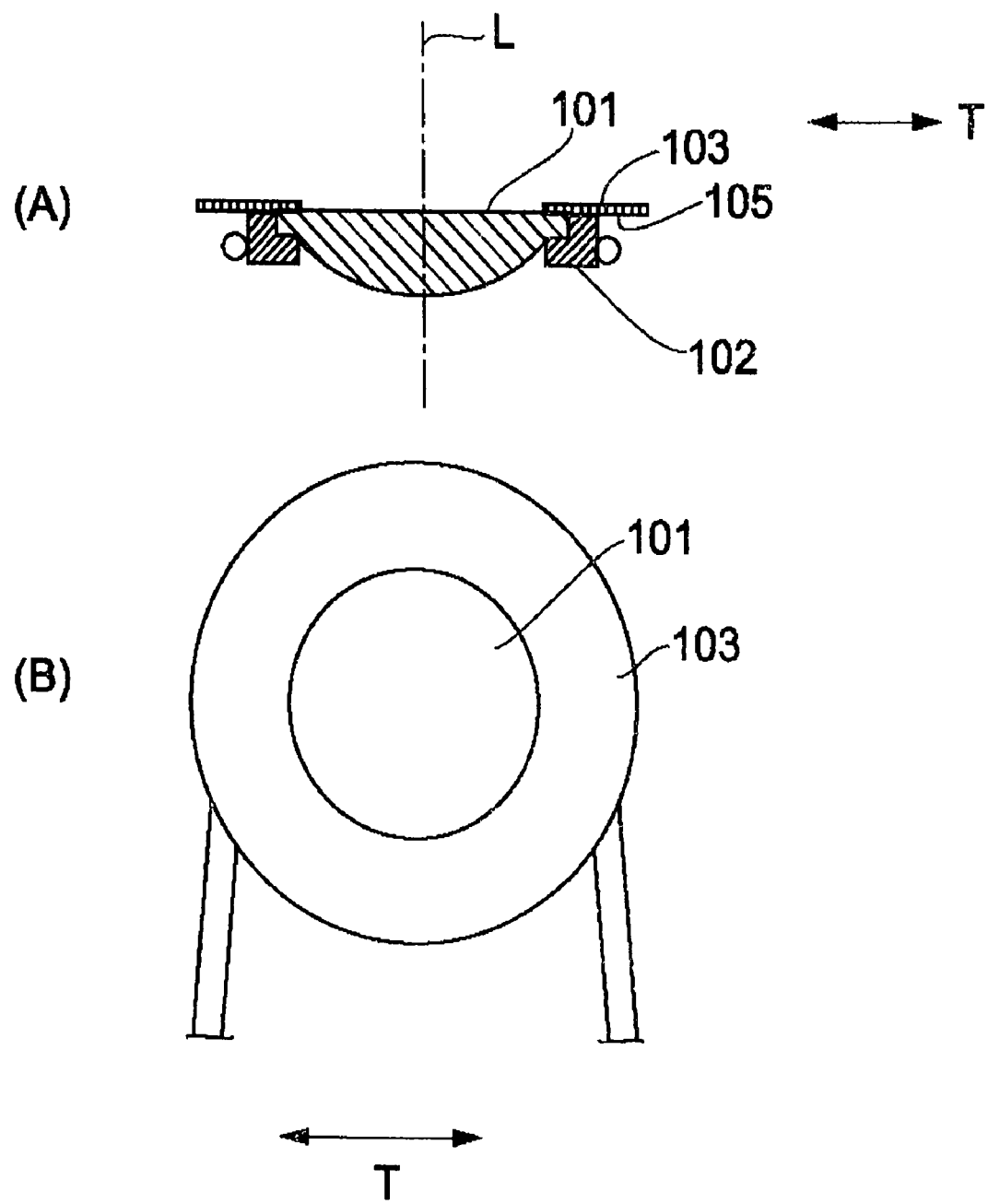
FIG. 4A and FIG. 4B are cross-sectional view and plane view showing light-blocking plate for the objective lens in the conventional optical head apparatus.

As shown in FIG. 2 and FIG. 3, objective lens drive mechanism 50 constitutes lens holder 51 made of synthetic resin retaining objective lens 5, and holder support part 52 that supports lens holder 51, and magnetic drive mechanism 53 for driving lens holder 51 in the tracking direction indicated by arrow T, and in the focusing direction indicated by arrow F.

Lens holder 51 is provided with body section 511 in the shape of a square tube, and cylindrical shaft receptacle section 512 located inside this body section 511. Body section 511 and shaft receptacle section 512 are connected by 4 ribs 513. From the upper end of body section 511, ring-shaped objective lens attachment section 514 extends toward the sides, objective lens 5 is affixed with adhesive 55 above this lens attachment section 514. Further, inside perimeter face of shaft receptacle section 512 becomes shaft hole 515.

Holder support part 52 is provided with square-shaped bottom wall 521, and one pair of outside yokes 522, 523 to the left and right that rise vertically from the end of the outer perimeter of this bottom wall 521. Support shaft 524 rises perpendicular to bottom wall 521 from its center; when shaft hole 515 for lens holder 51 has this support shaft 524 inserted therein, holder support part 52 can rotate lens holder 51 around support shaft 524 (tracking direction T), moreover, supports this shaft direction (focusing direction F) in a state capable of flexing motion. Inside yokes 525, 526 are positioned between body section 511 and shaft receptacle section 512 in lens holder 51 supported by support shaft 524. It can be seen in FIG. 2(c) where lens holder 51 is indicated by the line with double dashes, that inside yokes 525, 526 are formed by pulling up the two edges at the end of bottom plate 527 to standing position; by layering bottom plate 527 on bottom wall 521 of holder support part 52 and attaching thereto, these are respectively affixed vertically between outside yokes 522, 523 and support shaft 524. Further, support shaft 524 is a separate part that is attached to the part where bottom plate 527 is layered on bottom wall 521.

Magnetic drive mechanism 53 is provided with focusing drive coil 531 wrapped around body section 511 of lens holder 51, and tracking drive coil 532, 533, 534, 535 pasted on top of focusing drive coil 531, and drive magnet 536, 537 attached with same poles pointing toward lens holder 51 on the inner side of outside yoke 522, 523 in holder support part 52. Further, focusing drive coil 531, and tracking drive coil 532, 533, 534, 535 are connected to flexible substrate 54 attached to the end section on the opposite side of lens attachment section 514 in body section 511 of lens holder 51, power is supplied thereto.

In objective lens drive mechanism 50 constructed in this fashion, by passing electric current through focusing drive coil 531, it is possible to drive lens holder 51 in focusing direction F. Further, by passing electric current through tracking drive coil 532, 533, 534, 535, it is possible to drive lens holder 51 in tracking direction T.

Construction of Light-Blocking Section 9 in Lens in Lens Holder 51

In this embodiment, in lens holder 51, objective lens 5 is affixed in several locations with adhesive 55 to the top face of ring-shaped lens attachment section 514; on the other hand, on the bottom side of lens attachment section 514, light-blocking section 9, explained by using FIG. 1 as reference, is formed as one with lens holder 51.

Here, it can be seen clearly when lens holder 51 is observed from the bottom face, light-blocking section 9 is provided with a shape where there is large extension having width $W_T$ in tracking direction T, narrow part having width $W_R$ being positioned in direction R orthogonal to tracking direction T.

Further, dimensions W at both ends of tracking direction T in light-blocking section 9 are chosen to satisfy the formula below:

$$W > C + 2K$$

where C is effective diameter (diameter on optical recording medium side) of collimating lens 4, K is maximum amount of movement of objective lens 5 in tracking direction (maximum amount of movement from neutral position to one side in tracking direction).

For example, when effective diameter C of collimating lens 4 is 5.65 mm, maximum amount of movement K of objective lens 5 in tracking direction is 0.75 mm, $$C + 2K = 5.65 + 0.75 \times 2 = 7.15$$

In this embodiment, dimension W in tracking direction for light-blocking section 9 is set to be 7.2 mm, which is larger than 7.15 mm.

Consequently, in optical head apparatus 1 in this embodiment, no matter in which direction of tracking direction T objective lens 5 moves, the part of light that spreads outside the effective diameter of objective lens 5 in parallel light flux from collimating lens 4 is blocked by light-blocking section 9. In other words, light-blocking section 9 blocks nonessential light in the entire range of movement of objective lens 5 in the tracking direction; nonessential light does not reach optical recording disk 6.

Further, in this embodiment, in light-blocking section 9, light-blocking face 91 is slanted forward at angle θ which is 1° or more, toward the face orthogonal to optical axis L of objective lens 5. In this embodiment, angle θ is 25°. Because of this, light-blocking section 9, when nonessential light passing outside the effective diameter of objective lens 5 is blocked with light-blocking face 91, reflects this nonessential light in direction away from optical axis L, so that nonessential light blocked by light-blocking section 9, even when reflected by light-blocking face 91, does not reach photo detector 7.

Effects of the Embodiment

As explained above, in optical head apparatus 1 of this embodiment, in lens holder 51, light-blocking section 9 is provided that blocks as nonessential light, the part of light in parallel light flux from the collimating lens that has spread outside the effective diameter of objective lens 5, when objective lens 5 is driven in the tracking direction. Because of this, light that passes outside the effective diameter of objective lens 5 does not reach optical recording disk 6, so nonessential light reflected at optical recording disk 6 does not reach photo detector 7. Moreover, light-blocking section 9 is formed to extend more in tracking direction T; in the perimeter of objective lens 5, direction orthogonal to tracking direction T has only the narrow width frame part. Therefore, light-blocking section 9 is formed to have necessary minimum size so there is no impediment to miniaturization or weight reduction of optical head apparatus 1, nonessential light can be blocked very effectively.

Further, light-blocking face 91 positioned on light source side of light-blocking section 9, is slanted 1° or more toward the face orthogonal to the optical axis of objective lens 5; because of this, even when light entering objective lens 5 is parallel light, nonessential light blocked by light-blocking section 9 does not reach photo detector 7. Therefore, reflected light from light-blocking section 9 does not become nonessential light that interferes with signal detection at photo detector 7. Moreover, it is possible to prevent blocked light from light-blocking section 9 from reaching photo detector 7 by merely specifying the angle of light-blocking face 91, so there is no need to perform time-consuming processes such as applying light-blocking paint to light-blocking face 91, or implementing roughening treatment. Therefore, measures can be taken toward nonessential light without increase in manufacturing cost.

Further, in this embodiment, when lens holder 51 is formed by molding resin, because light-blocking section 9 is formed at the same time, measures can be implemented toward nonessential light without increase in manufacturing cost.

Other Practical Embodiments

In the aforementioned practical embodiment, light-blocking section 9 is formed as one with lens holder 91, but light-blocking section 9 may be formed as a light-blocking plate that is attached afterwards to lens holder 51. When such measures toward nonessential light are utilized, there is the advantage that measures toward nonessential light can be implemented without design changes to lens holder 51.

Further, besides attachment to lens holder 51, light-blocking section 9 can be provided as one with the end section of objective lens 5, or attached afterwards.

Furthermore, there are cases where light-blocking face 91 is constructed with multiplicity of faces; however, even such cases are acceptable as long as the respective faces are slanted 1° or more toward the face orthogonal to optical axis L of objective lens 5. Further, the slant direction is not limited to the forward direction, but can be in the backward or sideways direction, as long as the passage of nonessential light toward photo detector 7 can be avoided.

Moreover, in the aforementioned embodiment, explanation was made with flexing rotary motion axis model as the example for the objective lens drive apparatus, but this invention is applicable to optical head apparatus provided with the type of objective lens drive apparatus where lens holder is supported by wire suspension.

As explained above, in the optical head apparatus of this invention, when the objective lens is driven in the tracking direction, light that passes outside the effective diameter of the objective lens does not reach the optical recording medium, because light-blocking section is provided that blocks as nonessential light, the part of light that has spread outside the effective diameter of the objective lens. Moreover, light-blocking section is formed having necessary minimum size, extending only in the tracking direction, so non-essential light can be blocked very effectively without impeding miniaturization or weight reduction of the optical head apparatus.

While the foregoing description and drawings represent the present invention, it will be obvious to those skilled in the art that various changes may be made therein without departing from the true spirit and scope of the present invention.

REFERENCE SYMBOLS

1 Optical head apparatus
2 Laser light source
3 Half mirror
4 Collimating lens
5 Objective lens
6 Optical recording disk (optical recording medium)
7 Photo detector
9 Light-blocking section
50 Objective lens drive mechanism
51 Lens holder
52 Holder support part
53 Magnetic drive mechanism
91 Light-blocking face
514 Lens attachment section
L Optical axis
F Focusing direction
T Tracking direction
R Direction orthogonal to tracking direction

What is claimed is:

1. An optical head apparatus comprising:
   a light source;
   a lens holder for retaining objective lens that converges emitted light emitted from said light source on optical recording medium;
   a lens drive apparatus for driving said lens holder in the tracking direction at the least; and
   a photo detector for receiving reflected light from said optical recording medium;
   wherein said lens holder is provided with a tube-shaped body section and an objective lens attachment section to which the objective lens is attached, and
   wherein the objective lens attachment section of said lens holder includes a light-blocking section spread out on both sides of the tracking direction so as to be capable of blocking nonessential light from the said light source proceeding toward said optical recording medium by passing outside the effective diameter of said objective lens, and the light-blocking face is formed as a slanted face on a face of the objective lens attachment section on an opposite side to the objective lens.

2. The optical head apparatus of claim 1 wherein said objective lens is constructed so that incident light flux comprises light rays made parallel by a collimating lens; and wherein a light-blocking face located on said light source side in said light-blocking section is slanted at an angle of 1° or more toward the face orthogonal to the optical axis of said objective lens.

3. The optical head apparatus of claim 1 wherein dimensions at both ends in the tracking direction of said light-blocking section are such that light-blocking of said nonessential light is possible in the entire range of movement of said lens holder in the tracking direction.

4. The optical head apparatus of claim 2 which is configured so that when dimensions at both ends in the tracking direction of said light-blocking section, effective diameter of said collimating lens, and maximum amount of movement of said objective lens in the tracking direction are designated W, C, K, respectively, and wherein W, C, K are selected to satisfy the following formula: W>C +2K.

5. The optical head apparatus of claim 1 wherein, said light-blocking section is a part constructed as one with said lens holder.

6. The optical head apparatus of claim 2 wherein said light-blocking section is a part constructed as one with said lens holder.

7. The optical head apparatus of claim 1 wherein the objective lens attachment section protrudes from the tube-shaped body section and the objective lens is fixed on the objective lens attachment section and the light-blocking section having the light-blocking face is formed on the underface of the objective lens attachment section from a front end of the objective lens attachment section to the tube-shaped body section of the lens holder.

8. The optical head apparatus of claim 7 wherein the underface of the objective lens attachment section is connected to the tube-shaped body section of the lens holder in a continuously slanted manner to be formed with a continuously slanted face and the continuously slanted face is used as the light-blocking face.

* * * * *